United States Patent [19]

Martin

[11] Patent Number: 4,577,411
[45] Date of Patent: Mar. 25, 1986

[54] WHEEL FOR MEASURING HORIZONTAL TRAVELING STRIP

[76] Inventor: Merrill D. Martin, 2 Mall Court, Oakland, Calif. 94611

[21] Appl. No.: 723,490

[22] Filed: Apr. 15, 1985

[51] Int. Cl.[4] .............................................. G01B 7/04
[52] U.S. Cl. .................. 33/141 E; 33/129; 33/1 PT
[58] Field of Search ............ 33/141 E, 141 R, 147 L, 33/149 R, 149 J, 142, 134 R, 129, 125 M, 133, 136, 127, 141 B, 1 PT, 141.5

[56] References Cited

U.S. PATENT DOCUMENTS

| | | | |
|---|---|---|---|
| 2,778,117 | 1/1957 | Heinemann | 33/143 R |
| 3,436,954 | 4/1969 | Eppler | 33/129 |
| 3,716,773 | 2/1973 | Raoul | 318/600 |
| 3,838,519 | 10/1974 | Chick | 33/134 R |
| 4,020,406 | 4/1977 | Tokuno | 318/600 |
| 4,183,271 | 1/1980 | Martin | 83/156 |
| 4,481,715 | 11/1984 | Gilmore | 33/141 B |

Primary Examiner—Willis Little
Attorney, Agent, or Firm—Alfons Puishes

[57] ABSTRACT

A revolving wheel measures the horizontal length of travel of a moving flat material by contact with the material and connection to an instrument which counts the revolutions of the wheel and converts to length. The wheel is mounted on an arm which in turn is so mounted on a linkage as to maintain uninterrupted contact of the wheel in spite of deviations in the travel. Dashpots are employed to absorb the shock of such deviations which may be lateral or vertical.

6 Claims, 4 Drawing Figures

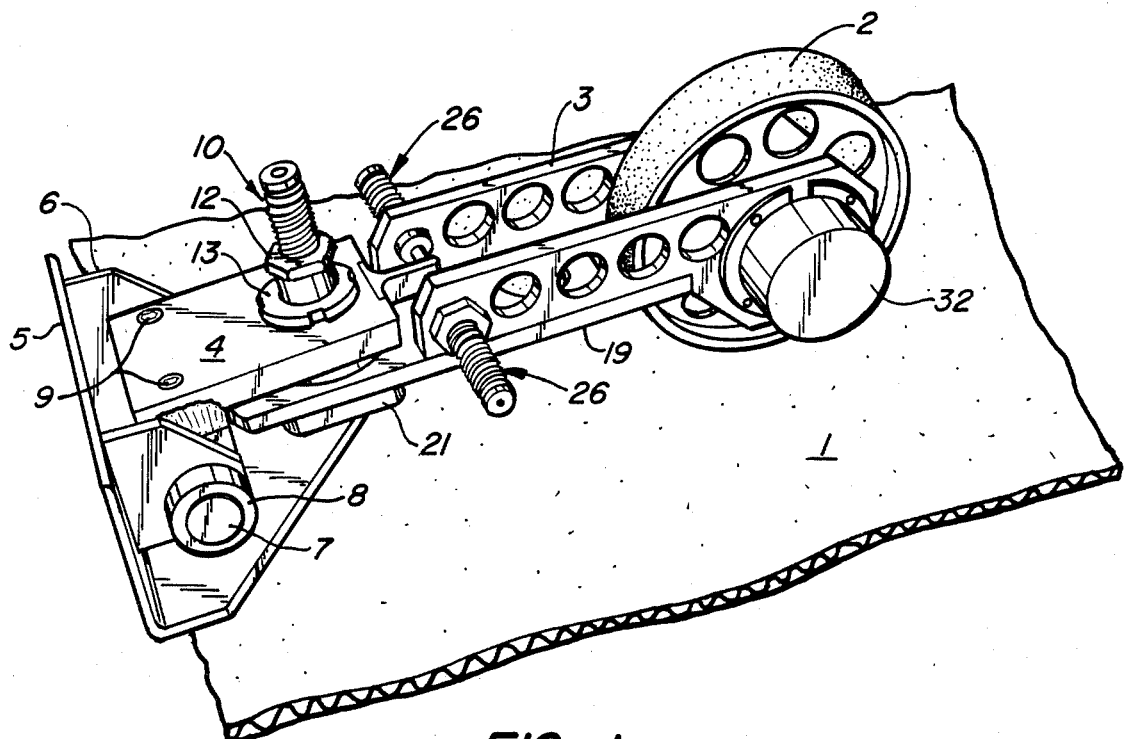
FIG._1.
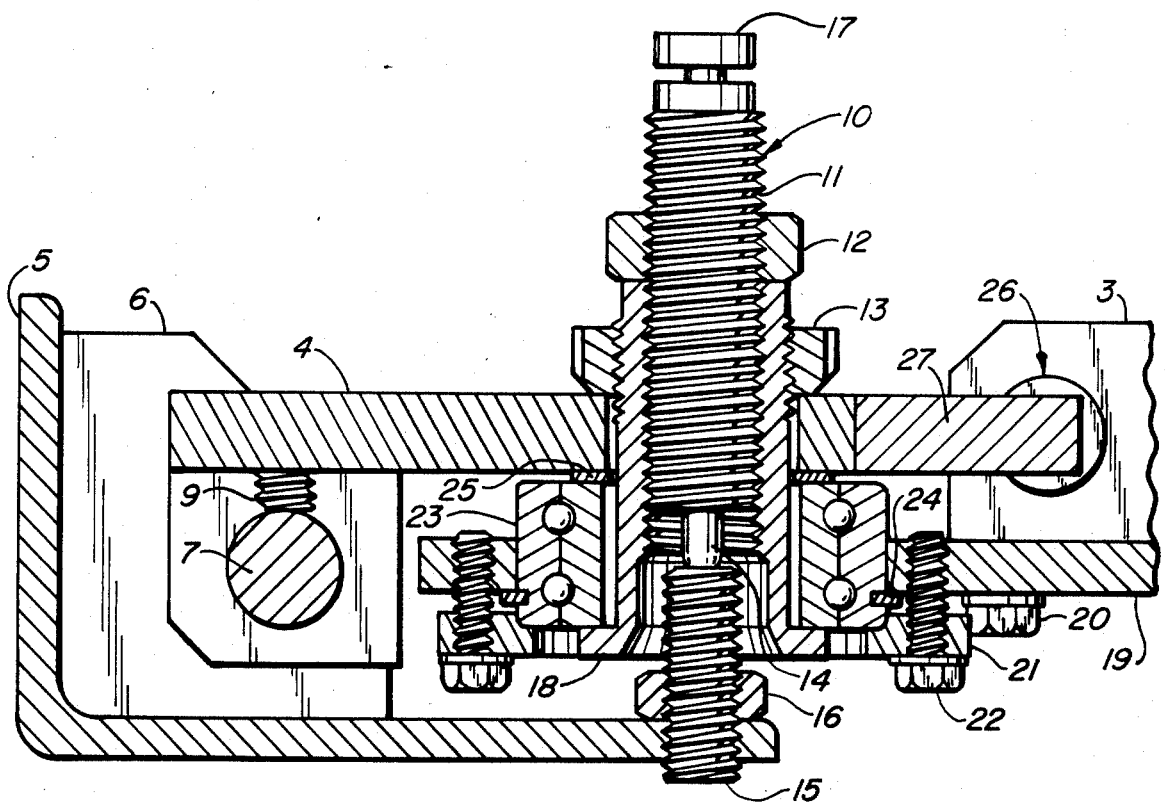
FIG._4.

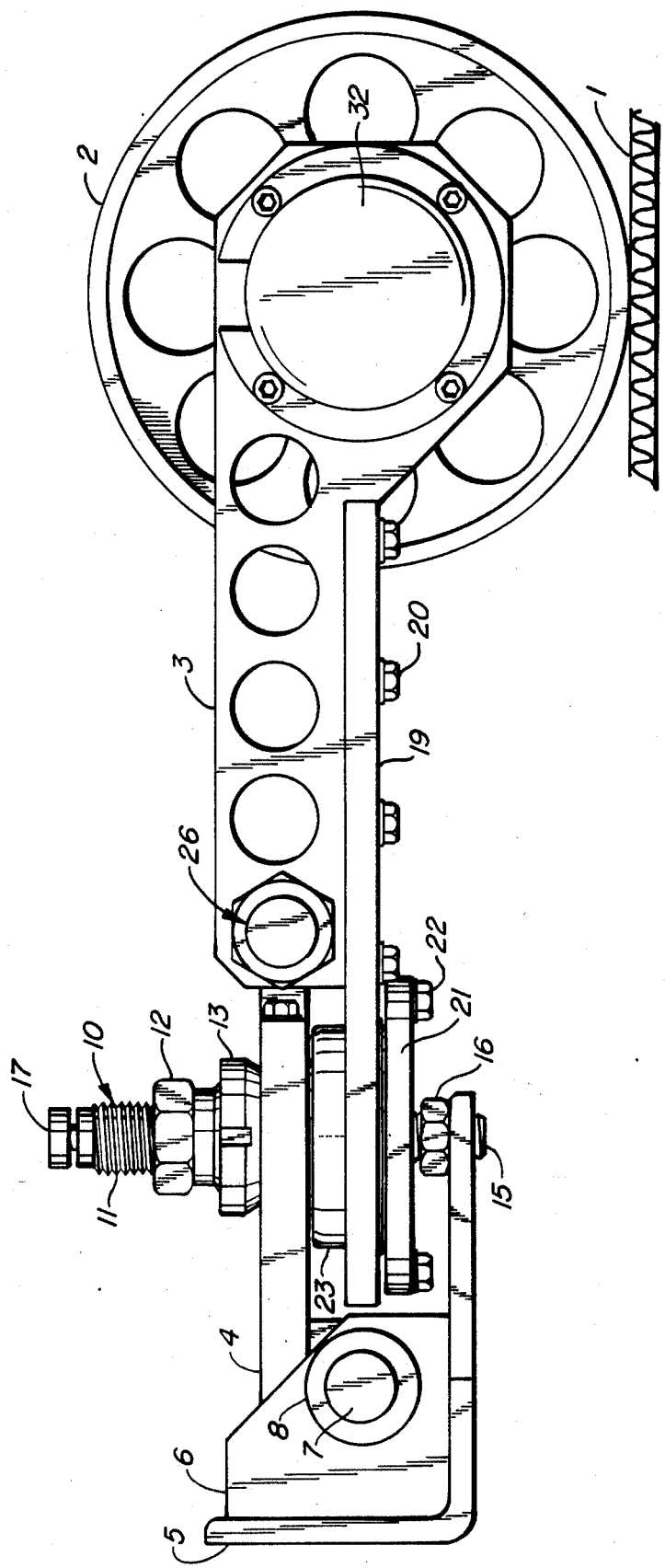
FIG._2.

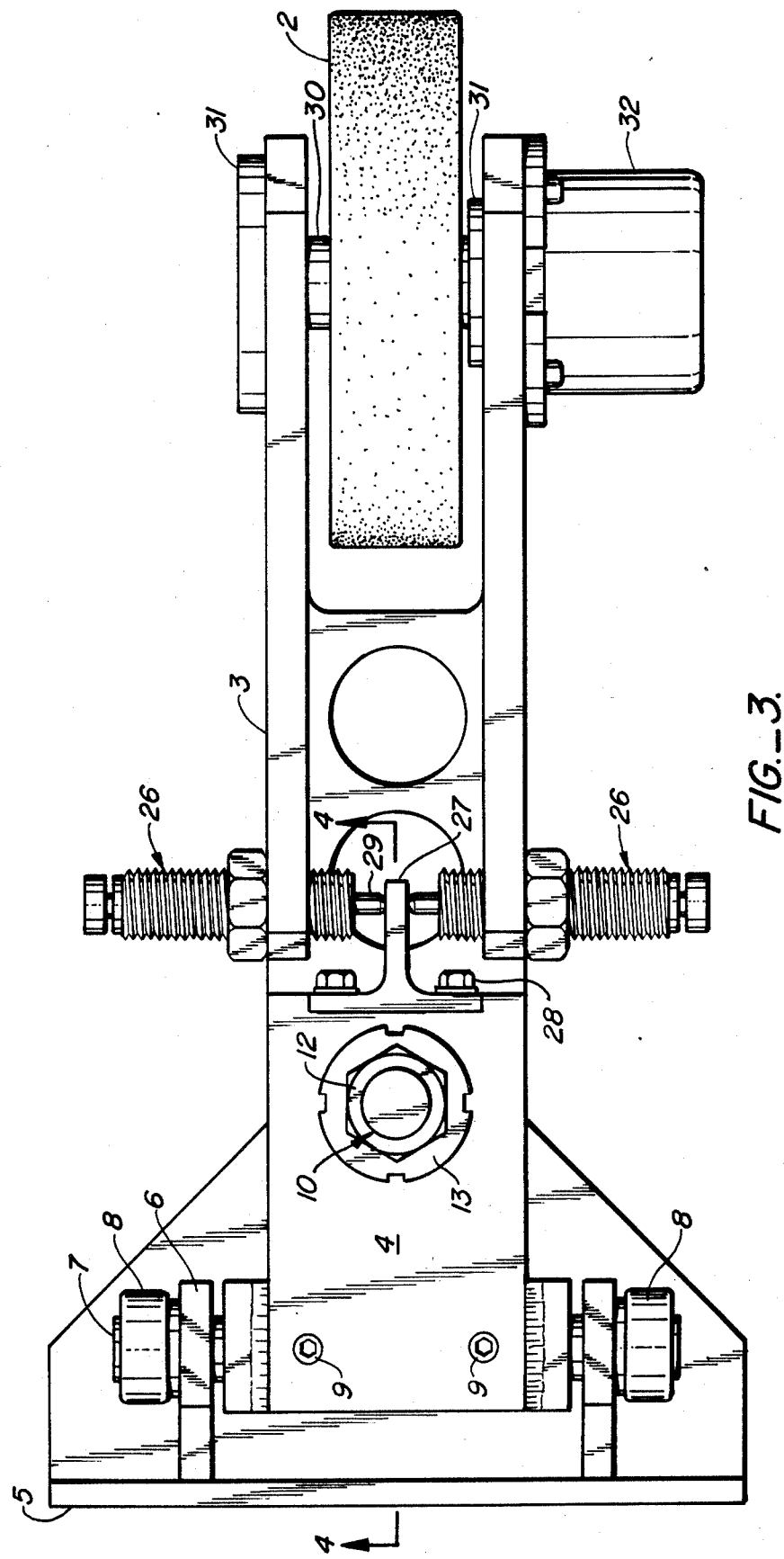
FIG._3.

WHEEL FOR MEASURING HORIZONTAL TRAVELING STRIP

BACKGROUND OF THE INVENTION

Machines for processing flat strips, sheet or web material, while moving through the machine usually involving cutting the material into suitable lengths or otherwise processing it are widely used. In any application it is important to measure the amount of length of travel of the material at suitable intervals. This is accomplished by utilizing a rotating wheel rotated by frictional contact with the surface of the moving material. The wheel is usually mounted above the material and is coupled to various counting devices such as pulse generators, tachometers, of transducers. The latter may in turn be connected to controls which govern the action of devices such as cut-off knives and other operations, which act on the moving material at selected intervals.

Illustrations of these are FIG. 14 of applicant's U.S. Pat. No. 4,183,271, FIG. 3 of Tokuno U.S. Pat. No. 4,020,406. Also illustrative are U.S. Pat. No. 3,716,773 to Raoul and U.S. Pat. No. 4,481,715 to Gilmore.

In all previous applications the measuring wheel is mounted on shafts or pivoted swing arms above the moving material and the force of gravity alone is relied upon for the periphery of the wheel to make continuous contact with the material, sometimes aided by springs, but with no precautions for accuracy under varying conditions of material travel as set forth below.

The problem of making an accurate measurement of the periodic lengths of material passing along the wheel is important for proper function of the operations performed by the machine on the material as controlled by the measuring wheel.

This becomes especially important where linear speeds of the material may vary from zero to 1,000 feet per minute. The motion or movement of the moving material may deviate laterally and sometimes suddenly by as much as 1" of the material or 10 degrees lateral swing of the arm holding the wheel. It may also bounce vertically as much as 1½". Such action causes skidding of the wheel and interferes with proper contact between the wheel and the material. This affects the accuracy of the measurement.

In none of the prior art known to me is any provision made for taking care of these conditions to effect greater accuracy of the measurement and hence the subsequent operations.

SUMMARY OF THE INVENTION

I have invented a method of mounting a wheel on a special support mechanism which permits it to pivot vertically as the material bounces and also to swing in a horizontal plane with the material as it deviates from a true straight line motion.

To absorb the shock of sudden changes in movement, I provide dash-pots engaging the wheel support frame to act as shock absorbers which add to the stability of the wheel with respect to the moving material, especially when the deviations in the travel of the material are sudden.

I have found that measurement by a wheel so mounted greatly improves its accuracy in eliminating the errors caused by lack of continuous and uninterrupted contact between the wheel and moving material.

A unique feature of my device is that the components of the mounting arrangement of my arm are such that my device will respond to irregular sidewise or lateral motion and vertical or bounce motion when these occur simultaneously, at all times maintaining full face contact with the moving material. This is accomplished by the novel linkage combination which I use and disclose herein.

DESCRIPTION OF THE FIGURES

FIG. 1 is a perspective view of the device of my invention in position for operation.

FIG. 2 is a side elevation of my device.

FIG. 3 is a top view of my device.

FIG. 4 is a section along line 4—4 and around the outside of the shock absorber on FIG. 3 showing construction of the pivot for horizontal motion combined with the vertical bounce dashpot of my device.

Referring now to the drawings, the moving material is indicated at 1 and the measuring wheel in contact with it and having a friction surface is shown at 2. The wheel may be of the order of 6" in diameter. A lever arm is shown at 3 on one end of which is supported the wheel 2 and the other joined to carriage 4 disposed for motion in a vertical plane. The lever arm may be of the order of 12" in length. The entire mechanism is supported by the bracket 5 which is disposed for attachment to the frame of a machine (not shown). A bracket with bearings 6 is shown connected to the angle bracket 5 and provides a pivot which permits the wheel to move in a vertical plane. This may be seen on all of the figures.

Referring now more specifically to FIG. 3, there is seen the shaft 7 which is supported in bearing 6 and held in position by collars 8. Set screws 9 join carriage 4 to shaft 7.

A vertical dashpot 10 is mounted on carriage 4. This may be of a type known as AC micro-cushion No. AS ¼ by ⅛ manufactured by Ace Controls, Inc., of Farmington, Mich. It is shown in greater detail on FIG. 4 and its support also acts as a pivot to permit the arm to swing in a horizontal plane.

The threaded exterior of the dashpot is shown at 11 which is connected to threaded spacer 12 and locknut 13. The dashpot plunger is shown at 14, the rest screw at 15 and the jam nut at 16. The adjusting dial for the dashpot is shown at 17. The lips 18 form an integral part of this dashpot support and serve to support the bearings providing for horizontal motion of the arm which may be seen from FIG. 3 and FIG. 4.

A support member for arm 3 is shown at 19 which is fastened to arm 3 by screws 20. A support plate 21 for this vertical pivot assembly which takes care of the horizontal movement of the arm is attached to the arm support member 19 by screws 22. At the end of arm support member 19 opposite wheel 2 and mounted within the vertical pivot assembly is a ball bearing 23 which may be of the New Departure series 5,000 type. This is held in position by snap ring 24 and provided with a clearance washer 25.

Referring now more specifically to FIG. 3, there are shown a pair of dashpots 26 which are of the same construction as dashpot 10 for the vertical movement described above. These take care of sudden horizontal movement of arm 3 due to lateral motion of the material and are engaged by lip 27 which is joined to carriage 4 by screws 28. The dashpot plungers engaging lip 27 are shown at 29.

Wheel 2 is mounted on a shaft 30 and rides on ball bearings 31 (not shown in detail). The shaft 30 connects with pulse counter 32 which may be of a type shown as BEI Encoder and is shown mounted on arm 3. This instrument may be designed to convert the rotation of wheel 2 into pulses and through suitable connections to the circuit controlling whatever operation it is desired to control on the strip 1.

It is thus seen how I provide continuous and uninterrupted contact between wheel 2 and material 1 regardless of deviation in movement of strip 1 and thus insure accuracy of measurement of the lengths.

I prefer to make my wheel of INVAR which has a zero co-efficient of expansion. I prefer to grit-blast the wheel surface and then hard chrome plate it to provide a more positive and durable friction surface. I thus take care of environmental temperature changes of 100° fahrenheit if necessary. The holes shown in wheel 2 and arm 3 are for weight reduction.

In some applications I may not need the horizontal shock absorbers 26 but in other conditions the motion of the web material can develop a side to side movement or "shimmying" and in these cases these shock absorbers are extremely useful.

In any event, exhaustive tests have shown that the use of my device has greatly improved the operation of the machines on which it has been installed.

I claim:

1. In a device for measuring the horizontal travel of a flat strip of material through a machine by means of a rotating wheel which engages the surface of said material and is connected to a digital counting mechanism, the improved method of support comprising:
   a carriage positioned on said machine and disposed for pivoting in a vertical plane;
   an arm extending horizontally from said carriage, one end being pivotally mounted thereon to permit pivoting of said arm in a horizontal plane;
   said rotating wheel being rotatably on the opposite end of said arm;
   whereby engagement between said wheel and said material is maintained despite horizontal or vertical deviation of said horizontal travel of said material from a straight line.

2. The device of claim 1 including:
   dashpots positioned on said arm and engaging said carriage disposed to absorb the shock produced by sudden lateral motion of said arm in a horizontal plane.

3. The device of claim 1 including:
   a dashpot positioned on said carriage and engaging said arm disposed to absorb the shock produced by sudden motion of said arm in a vertical plane.

4. A device for measuring the amount of horizontal travel of a moving flat strip of material comprising:
   a rotating wheel having a peripheral friction surface disposed for contact with the surface of said moving material;
   said wheel being rotatably mounted at the first end of a horizontal arm pivotally mounted on a frame;
   said arm having a first pivot positioned at its second end to permit said wheel to swing in a vertical plane while maintaining said wheel in contact with said moving material;
   said arm having a second pivot positioned close to said second end to permit said wheel to swing in a horizontal plane while maintaining said wheel in contact with said moving material;
   a shaft engaging said wheel;
   said shaft being disposed for connection to a digital counting device;
   dashpots horizontally mounted on said arm disposed to absorb the shock produced by sudden lateral motion of said arm in a horizontal plane;
   whereby said wheel and said counting device are responsive to the lateral and vertical movement of said material during its horizontal travel.

5. A device for measuring the amount of horizontal travel of a moving flat strip of material comprising:
   a rotating wheel having a peripheral friction surface disposed for contact with the surface of said moving material;
   said wheel being rotatably mounted at the first end of a horizontal arm pivotally mounted on a frame;
   said arm having a first pivot positioned at its second end to permit said wheel to swing in a vertical plane while maintaining said wheel in contact with said moving material;
   said arm having a second pivot positioned close to said second end to permit said wheel to swing in a horizontal plane while maintaining said wheel in contact with said moving material;
   a shaft engaging said wheel;
   said shaft being disposed for connection to a digital counting device;
   a dashpot engaging said arm disposed to absorb the shock produced by a sudden motion of said arm in a vertical plane;
   whereby said wheel and said counting device are responsive to the lateral and vertical movement of said material during its horizontal travel.

6. The device of claim 5 in which the central axis of said dashpot coincides with the central vertical axis of said second pivot.

* * * * *